(12) United States Patent
Hedstrom

(10) Patent No.: US 9,485,116 B2
(45) Date of Patent: *Nov. 1, 2016

(54) CELLULAR PHONE LINE REPLACEMENT ADAPTER

(71) Applicant: BrightSky, LLC, Naples, FL (US)

(72) Inventor: Mark Hedstrom, Naples, FL (US)

(73) Assignee: Brightsky, LLC, Naples, FL (US)

( * ) Notice: Subject to any disclaimer, the term of this patent is extended or adjusted under 35 U.S.C. 154(b) by 300 days.

This patent is subject to a terminal disclaimer.

(21) Appl. No.: 14/193,461

(22) Filed: Feb. 28, 2014

(65) Prior Publication Data

US 2014/0179367 A1   Jun. 26, 2014

Related U.S. Application Data

(63) Continuation of application No. 11/548,515, filed on Oct. 11, 2006, now Pat. No. 8,676,254.

(60) Provisional application No. 60/726,046, filed on Oct. 12, 2005.

(51) Int. Cl.
*H04L 12/54* (2013.01)
*H04W 84/14* (2009.01)
(Continued)

(52) U.S. Cl.
CPC ......... *H04L 12/5692* (2013.01); *H04B 1/3805* (2013.01); *H04W 84/14* (2013.01); *H04W 88/08* (2013.01)

(58) Field of Classification Search
USPC ........................................... 455/553.1, 422.1
See application file for complete search history.

(56) References Cited

U.S. PATENT DOCUMENTS 5,419,716 A   5/1995   Sciammarella et al.
5,479,480 A   12/1995   Scott
(Continued)

FOREIGN PATENT DOCUMENTS

EP   0863648 A3   9/1998
WO   WO98/47300   10/1998
WO   WO00/09019   2/2000

OTHER PUBLICATIONS

Final Office Action dated Feb. 4, 2011 received for U.S. Appl. No. 11/548,515.
(Continued)

*Primary Examiner* — Kent Chang
*Assistant Examiner* — Chayce Bibbee
(74) *Attorney, Agent, or Firm* — Jon Gibbons; Fleit Gibbons Gutman Bongini & Bianco PL

(57) ABSTRACT

An apparatus and system automatically process and route data messages or packets, via a cellular network, from analog or digital data devices, wherein the routing is accomplished without a need for voice call origination on the cellular network. The apparatus includes a fixed cellular communication device and may also include a fixed wireless RF communication device and/or a mobile wireless RF transceiver. The fixed cellular communication device formats and transmits, on a cellular network, data packets received from data devices directly connected to the fixed cellular communication device and/or data packets received wirelessly from the fixed wireless RF communication device and/or from the mobile wireless RF transceiver. The fixed cellular communication device has a physical form of an AC wall adapter.

32 Claims, 6 Drawing Sheets

(51) Int. Cl.
*H04W 88/08* (2009.01)
*H04B 1/3805* (2015.01)

(56) References Cited

U.S. PATENT DOCUMENTS

| | | |
|---|---|---|
| 5,805,416 A | 9/1998 | Friend et al. |
| 6,241,550 B1 | 6/2001 | Laity et al. |
| 6,252,883 B1 | 6/2001 | Schweickart et al. |
| 6,349,199 B1 | 2/2002 | Armantrout |
| 6,738,647 B1 | 5/2004 | Link, II |
| 6,999,761 B2 | 2/2006 | Bacon et al. |
| 8,315,628 B2 | 11/2012 | Thermond |
| 8,503,363 B2 | 8/2013 | Fulknier et al. |
| 2001/0027121 A1 | 10/2001 | Boesen |
| 2002/0146014 A1 | 10/2002 | Karlsson et al. |
| 2004/0164619 A1 | 8/2004 | Parker et al. |
| 2004/0204031 A1 | 10/2004 | Kardach et al. |
| 2005/0009560 A1 | 1/2005 | Cavill et al. |
| 2005/0113085 A1 | 5/2005 | Giacopelli et al. |
| 2005/0136972 A1* | 6/2005 | Smith ............... H04B 3/542 455/554.1 |
| 2005/0169056 A1 | 8/2005 | Berkman et al. |
| 2005/0181727 A1 | 8/2005 | Russo |
| 2006/0114883 A1 | 6/2006 | Mehta et al. |
| 2006/0212853 A1 | 9/2006 | Sutardja |

OTHER PUBLICATIONS

Non-Final Office Action dated Jan. 17, 2013 received for U.S. Appl. No. 11/548,515.
Final Office Action dated Jun. 20, 2013 received for U.S. Appl. No. 11/548,515.
Non-Final Office Action dated Apr. 29, 2009 received for U.S. Appl. No. 11/548,515.

* cited by examiner

CELLULAR PHONE LINE REPLACEMENT ADAPTER

CROSS REFERENCE TO RELATED APPLICATIONS

This application is a continuation of prior U.S. application Ser. No. 11/548,515, filed Oct. 11, 2006, now U.S. Pat. No. 8,676,254 B2, issued Mar. 18, 2014. The entire disclosure of U.S. application Ser. No. 11/548,515 is hereby incorporated by reference herein. The present application claims priority to U.S. Provisional Application No. 60/726,046 filed on Oct. 12, 2005, which is hereby fully incorporated by reference herein.

BACKGROUND OF THE INVENTION

1. Field of the Invention

The present invention relates to a fixed cellular communication device for transmitting data over a cellular communications network.

2. Description of Related Art

Traditionally, analog data devices such as security panels, alarm panels, satellite set top boxes (STB), point of sale terminals (POS), credit card machines, remote data devices, telemetry devices, etc., use Plain Old Telephone Service (POTS) lines for communication. However, with the widespread proliferation of cellular service, many POTS lines are being displaced by cellular service. In other cases, POTS line availability is non-existent. A signaling method used by these analog data devices is typically accomplished using an analog modem, which utilizes frequency-shift keying (FSK) or dual-tone multi-frequency (DTMF) at a low baud rate. In addition, a modem of an originating analog data device requires an answering modem at the end, or called, communication point, which provides FSK tones for at least: handshaking, message termination, cyclic redundancy checks, etc. Analog data devices, by nature, send messages that are typically short in length and require a return message from the answering or destination point. Furthermore, a dial-tone and loop current must be provided by another device to simulate a POTS line interface, which is typically required by the analog data device. Due to the interface requirements of the modem in the analog data device, direct connection to a cellular device is impossible due to requirements of a dial-tone and a loop current, which cannot be provided by the cellular device. In addition, a cellular device in the form of a fixed wireless terminal (FWT) or fixed wireless cellular terminal (FCT) requires set-up command strings to set it in a correct cellular transmission mode. While interfaces have been devised to overcome these interface issues, the cellular device must still originate a call on a cellular network, thereby invoking traditional voice rates from a serving cellular carrier.

SUMMARY OF THE INVENTION

The present invention relates to a method and apparatus for automated processing and routing of data messages or packets, via the cellular network, from analog or digital data devices. The present invention comprises a fixed cellular communication device, a fixed wireless Radio Frequency (RF) communication device, and a mobile wireless RF transceiver.

The fixed cellular communication device (dongle) comprises elements such as, but not limited to: a cellular transceiver, a switched-mode power supply, an analog modem, a wireless RF bi-directional communication transceiver, a subscriber line interface, an Ethernet port, a tone generator, a loop power supply, a Global Positioning System (GPS) receiver (optional), and a microcontroller with memory.

The fixed communication device may have multiple configurations and may utilize any cellular communications network including, but not limited to, Advanced Mobile Phone Service/Code Division Multiple Access (AMPS/CDMA), Global System for Mobile Communications (GSM), Universal Mobile Telecommunications System (UMTS) and Worldwide Interoperability for Microwave Access (WiMAX). Integral to the cellular communication device is a wireless RF transceiver that can provide a secure, point to point or point to multi-point, short range communications link. If needed, the integral RF communication link may utilize at least the following wireless access methods: Bluetooth®, ZigBee®, WiFi, WiMAX®, FHSS, DSSS, FM, FSK, AM, UWB or other wireless access methods. The RF communication link may be used for, but is not limited to, transmitting and receiving signals from another fixed remote wireless RF communication device connected to a data device, which may include at least the following: a satellite set top box; a security panel; an alarm panel; a telemetry device; a Supervisory Control And Data Acquisition (SCADA) device; a Point of Sale (POS) terminal; a credit card machine; or a vending machine. The RF communication link may also be used to send and receive data from a mobile, or nomadic, wireless RF transceiver.

A fixed cellular communication device connected to an RJ-11 modem communication jack of a data device recognizes when the data device attempts to communicate with another device or location. In addition, the fixed cellular communication device may utilize, as a secondary means of communication, a serial data port for communication with the data device. Upon the initiation of communication by the data device, the fixed cellular communication device processes the data and forwards it as a series of formatted circuit switched or packet switched data packet(s) via a cellular network, to a central processing system without a need for a voice call origination on the cellular network. The central processing system re-formats the message into the original form sent by the data device. This information or message can then be disseminated by the central processing system to other points or systems. In addition, the fixed cellular communication device can receive messages from the central processing system via the cellular network. The received message is re-formatted by the fixed cellular communication device into the original message form and the message is sent to the data device that originated the message to the central processing system. The fixed cellular communication device may also utilize a bi-directional, wireless RF link to communicate with other wireless RF communication devices that are within range, which are connected to a remote data device. In addition, the fixed cellular communication device can provide a high speed, bi-directional Transmission Control Protocol (TCP) Internet Protocol (IP) data link via the cellular network, as yet a third means of communication with a data device.

Furthermore, the wireless RF link capability of the device can be used to communicate with a mobilize wireless RF device for the purpose of sending and receiving unique data or information to and from the mobile device. Data from the mobile device can be sent over the cellular network to the central processing point via either the fixed cellular communication device or a fixed wireless RF communication device acting as a repeater to the device.

In accordance with these and other objects which will become apparent hereinafter, the instant invention will now be described with particular reference to the accompanying drawings.

DETAILED DESCRIPTION

Figure 1:
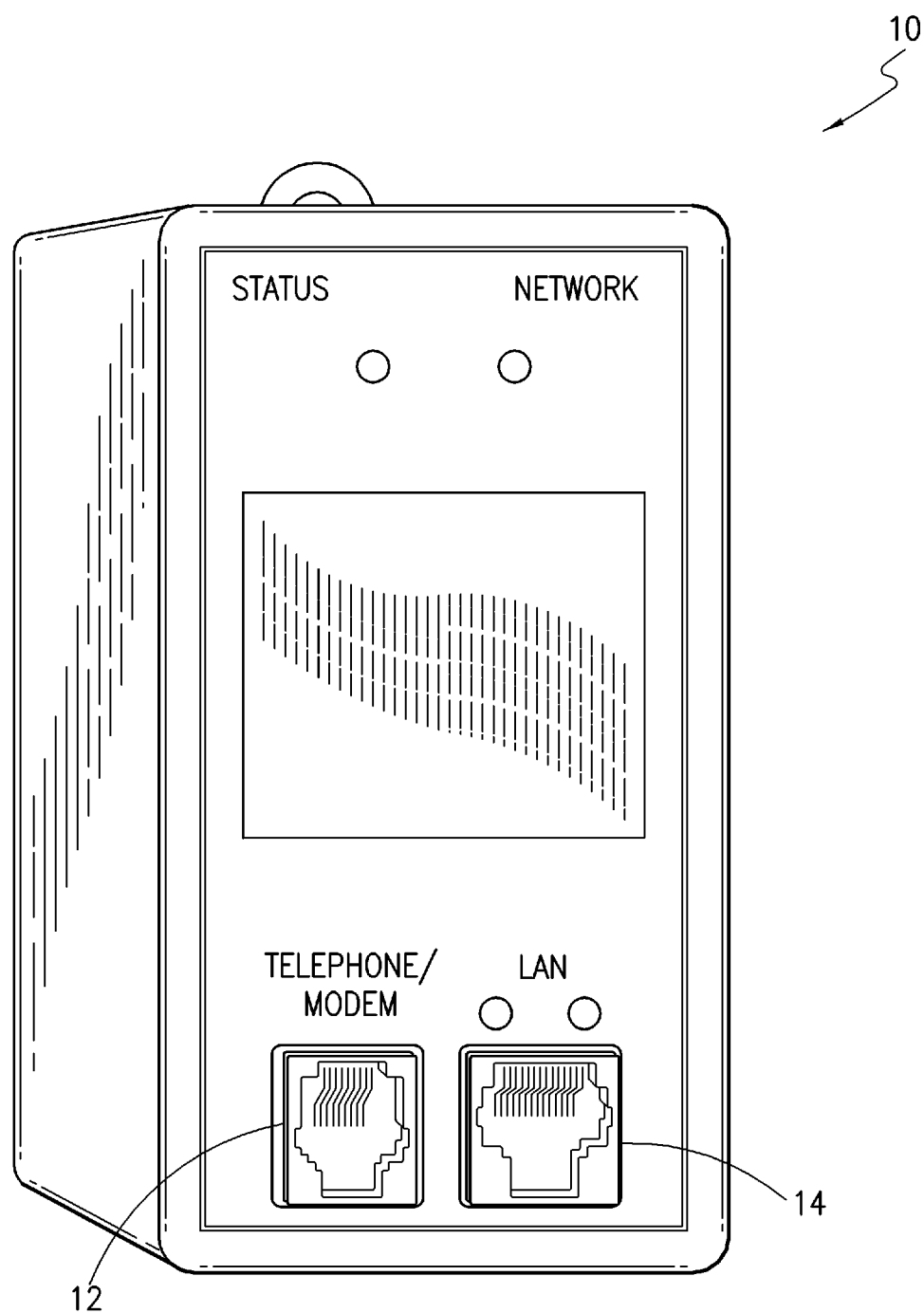
FIG. 1 shows a perspective view of a fixed cellular communication device in a physical form of an AC wall adapter according to the present invention.

FIG. 1 shows a perspective view of a fixed cellular communication device 20 (see FIG. 3) according to the present invention. As visible from the view of FIG. 1, the fixed cellular communication device 20 is adapted in a physical form of an AC wall adapter 10 which includes a phone jack 12 and an Ethernet jack 14.

Figure 2:
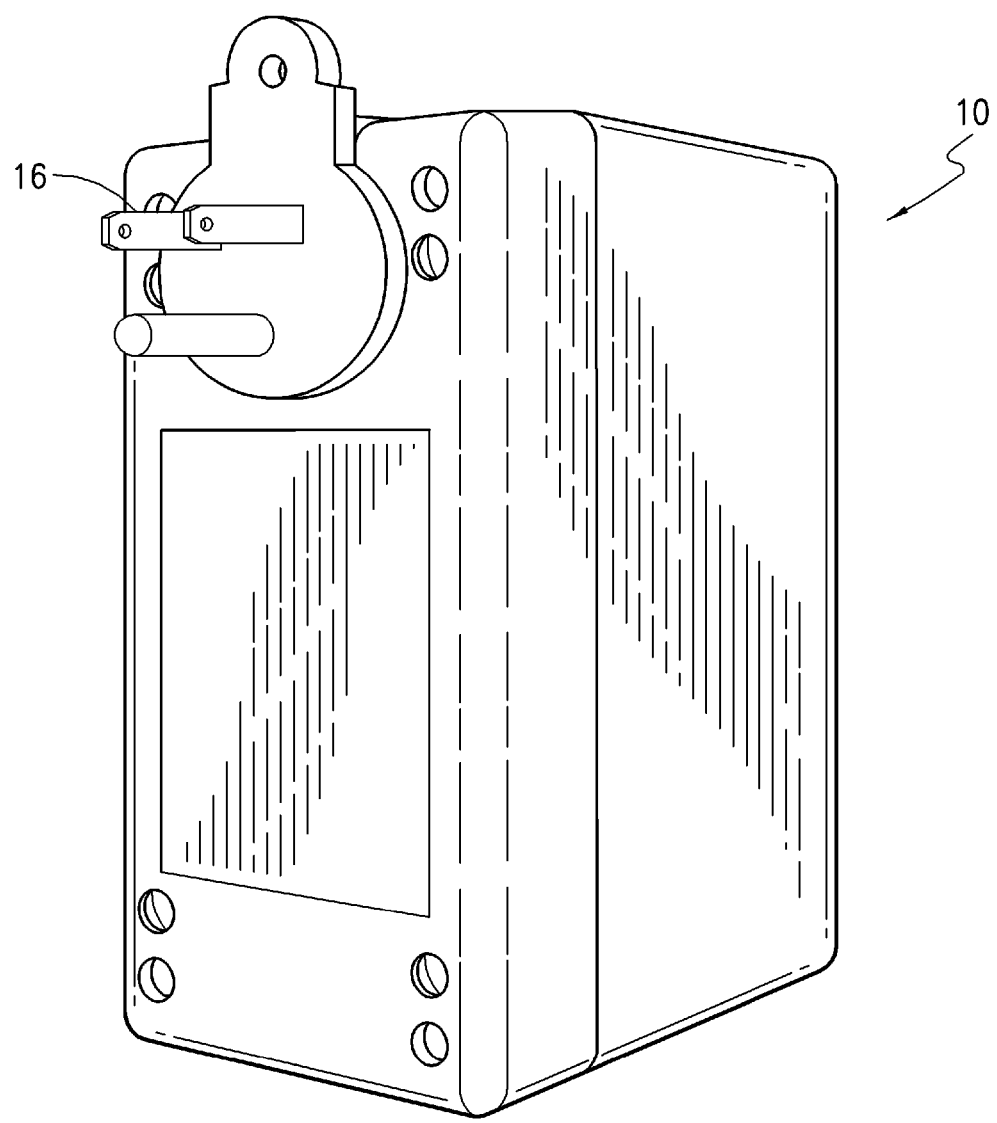
FIG. 2 shows a perspective rear view of the AC wall adapter according to the present invention.

FIG. 2 provides a rear view of the AC wall adapter 10 which essentially shows an AC plug, or AC input, 16. A user may connect the AC wall adapter 10 into any AC outlet available. Once the fixed cellular communication device 20 is connected and supplied with power, the user may use the various functions that are associated with the fixed cellular communication device 20 such as transmission of data over a cellular network including modem transmissions and GPS data transmissions. The fixed cellular communication device 20 enables the user to use a mobile wireless RF transceiver 50 (see FIG. 5) or a fixed wireless RF communication device 30 (see FIG. 4) for transmission of data via the cellular network. One advantageous feature of the fixed cellular communication device 20 is its ability to transmit data in formatted packets via the cellular network without the need for call origination.

Figure 3:
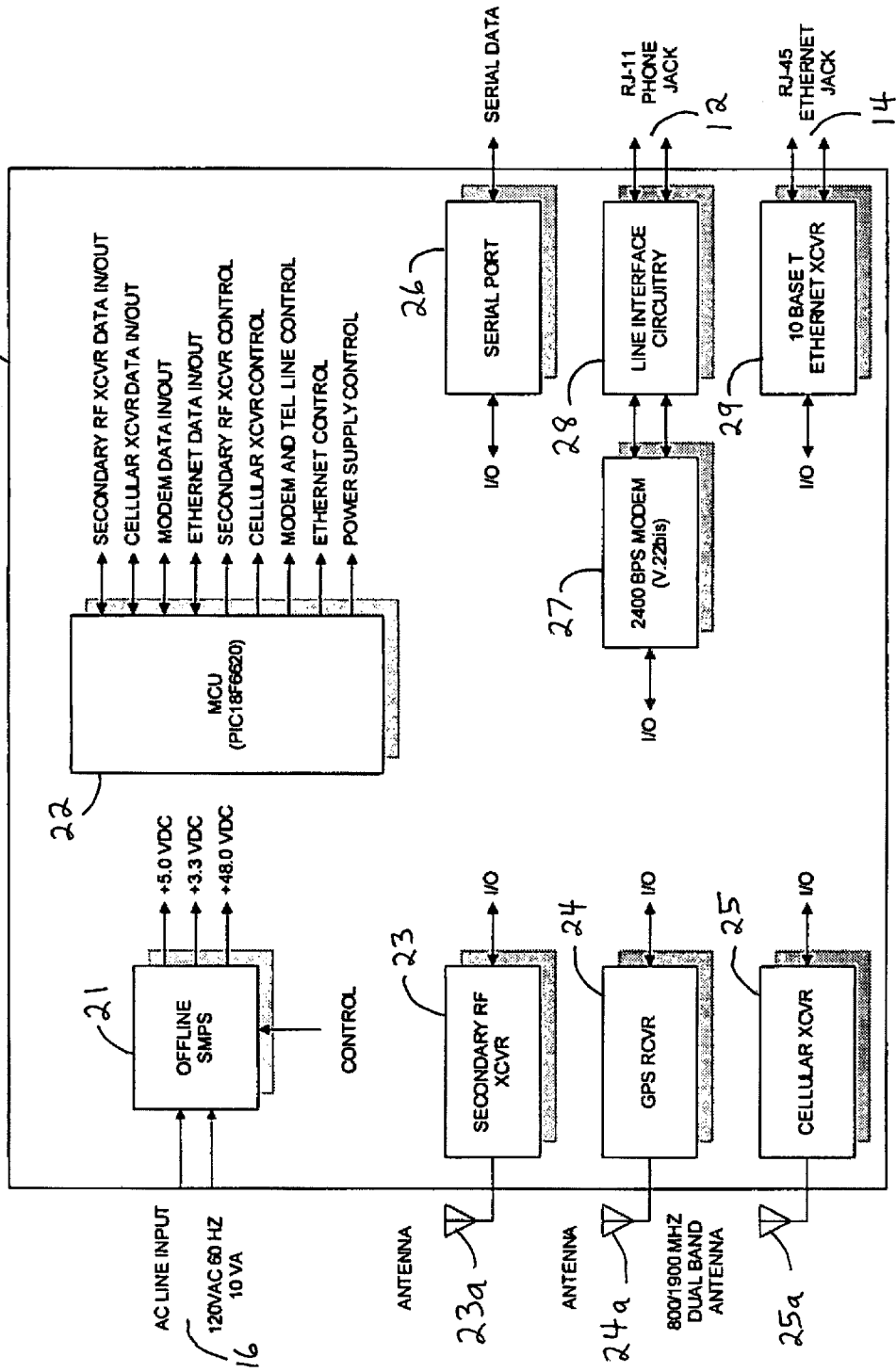
FIG. 3 shows a block diagram of the components of the fixed cellular communication device according to the present invention.

FIG. 3 shows an overview block diagram of the fixed cellular communication device 20 according to the present invention. The components within the cellular communication device 20 include Ethernet transceiver 29, subscriber line interface circuitry 28 connected to an internal modem 27, and a serial data port 26. The Ethernet jack 14, the phone jack 12 and the serial data port 26 provide hardware connections for various communication devices which may transmit and receive voice/data through the cellular communication device 20. The subscriber line interface circuitry 28 provides a dial tone and loop voltage in order to simulate a POTS line. Accordingly, the subscriber line interface circuitry 28 may be used to transmit voice signals and data signals through the internal modem 27. The Ethernet transceiver 29 includes provisions for 10 Base T, CAT-5 bi-directional data, which supports data services via a cellular network.

Other components shown in the block diagram of FIG. 3 include: cellular transceiver 25 and antenna 25a; GPS receiver 24 and antenna 24a; and secondary RF transceiver 23 and antenna 23a. The secondary RF transceiver 23 provides a non-cellular communication link for point to point or point to multi-point communications with either fixed or mobile devices. The secondary RF transceiver 23 also utilizes a received signal strength indicator (RSSI) to determine the distance from a mobile device. Furthermore, the secondary RF transceiver provides a non-cellular communication link for the purpose of sending and receiving data initiated from another fixed or mobile device. The GPS receiver 24 assists in the transmission of position or location data over the cellular network. The cellular transceiver 25 advantageously allows for the sending and receiving of data in the form of short data packets over a cellular network. The transmission of these packets of either voice or data information may be sent without the need for call origination on the cellular network.

The fixed cellular communication device 20 also includes a switched-mode power supply 21 which receives power through the AC input 16, 120VAC 60 Hz, and distributes voltage in three different modes as shown, 5VDC, 3.3VDC and 48VDC. A microcontroller 22 controls the various components shown in the block diagram (see FIG. 3) of the fixed cellular communication device 20. In one embodiment, the microcontroller 22 is a model PIC18F6620 microcontroller manufactured by Microchip Technology, Inc., of Chandler, Ariz. Input and output functions are shown for the Ethernet transceiver 29, the internal modem 27, the cellular transceiver 25, the GPS receiver 24 and the secondary RF transceiver 23. Control functions are also shown for the aforesaid components of the fixed cellular communication device 20 and for the switched-mode power supply 21.

Figure 4:
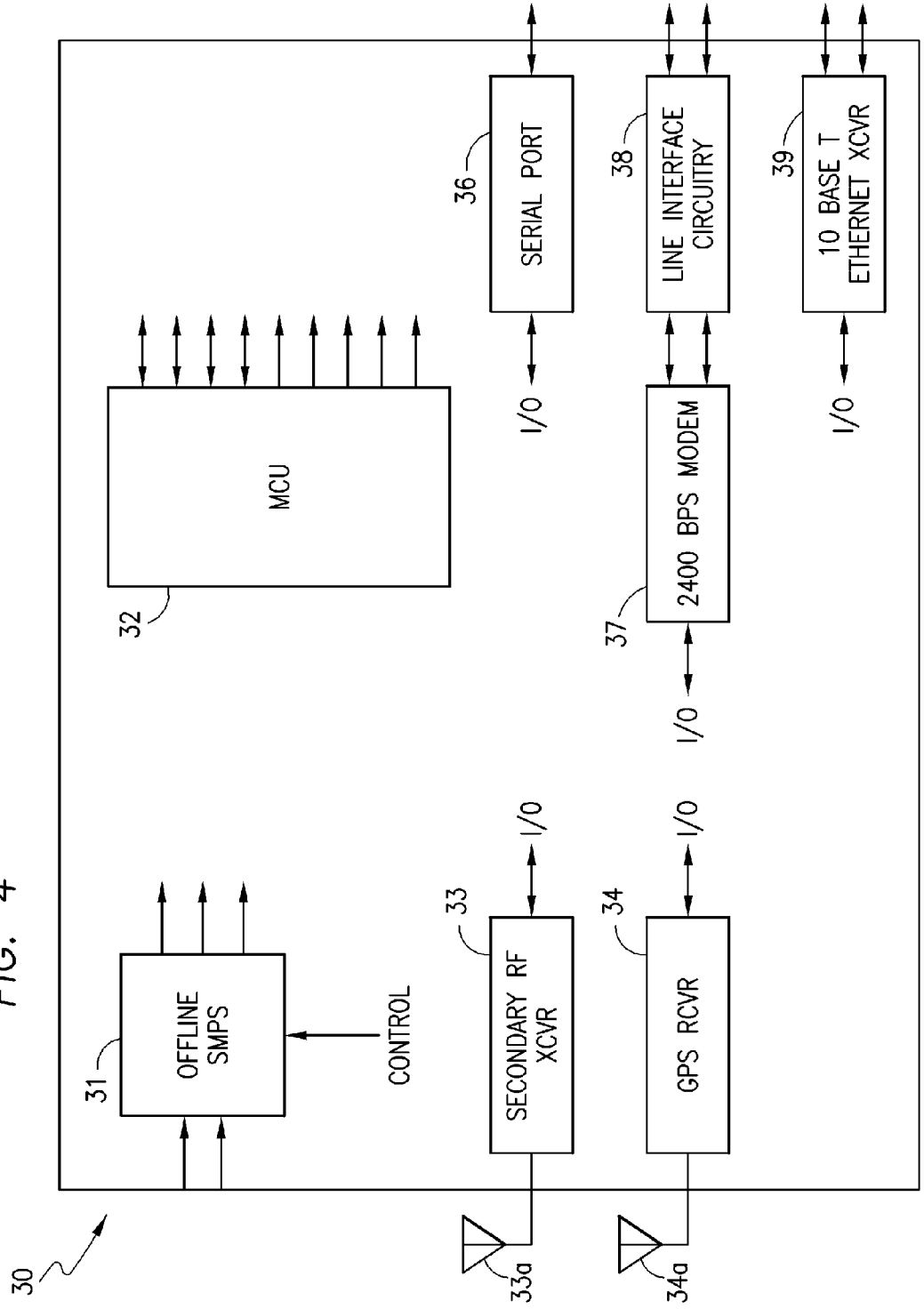
FIG. 4 shows a block diagram of the components of a wireless RF communication device according to the present invention.

FIG. 4 shows a block diagram of the wireless RF communication device 30. The wireless RF communication device 30 includes essentially all the components as depicted in the fixed cellular communication device 20, excluding a cellular transceiver. Accordingly, the wireless RF communication device 30 includes a microcontroller 32; a secondary RF transceiver 33 and antenna 33a; a GPS receiver 34 and antenna 34a; a serial data port 36; a line interface circuitry 38, including a RJ-11 phone jack, connected to an internal modem 37; an Ethernet transceiver 39 including an Ethernet jack; and a switched-mode power supply 31. The wireless RF communication device 30 may transmit data via the secondary RF transceiver 33 to the fixed cellular communication device 20 via the secondary RF transceiver 23. The Ethernet jack, the RJ-11 phone jack, and the serial data port 36 provide a means for hardware to be connected to the wireless RF communication device 30. Wireless communications may be transmitted via the secondary RF transceiver 33 and GPS receiver 34.

Figure 5:
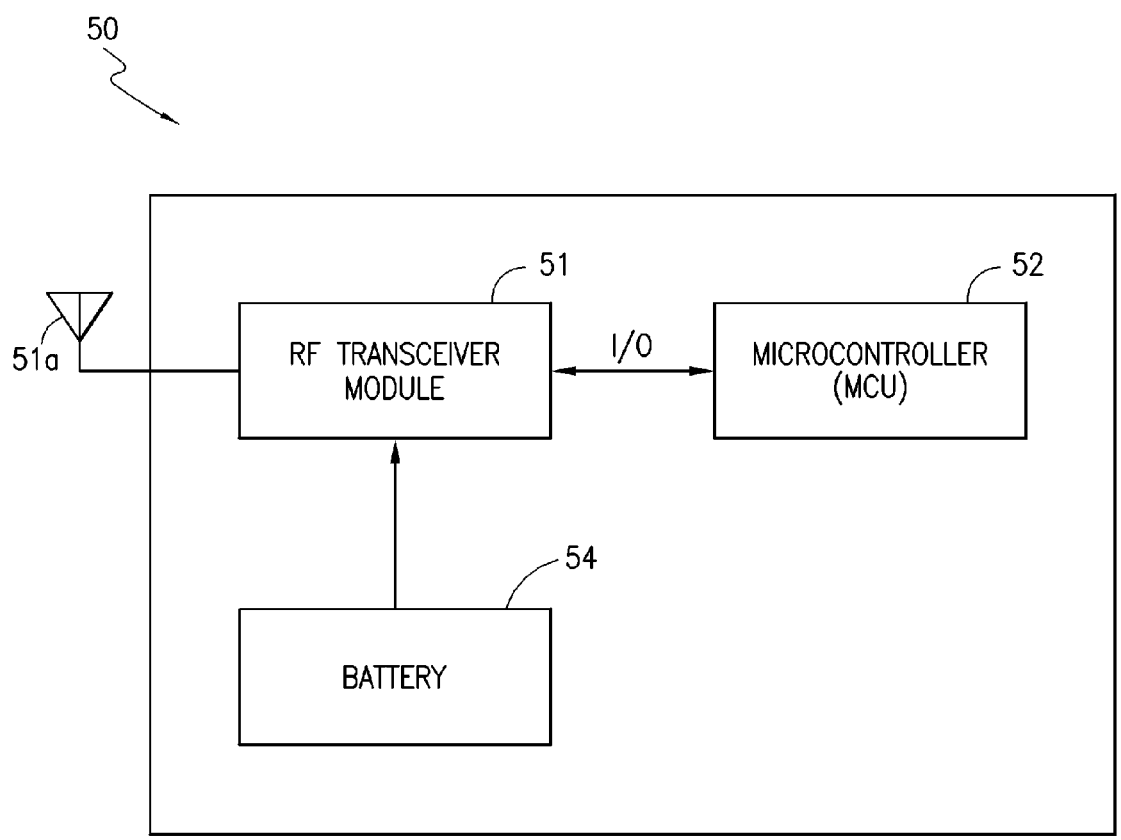
FIG. 5 shows a block diagram of a mobile wireless RF transceiver.

FIG. 5 shows a block diagram of the mobile wireless RF transceiver 50 which includes a microcontroller 52, a RF transceiver module 51, a battery 54 and an antenna 51a. The mobile wireless RF transceiver 50 may easily access a cellular network via the fixed cellular communication device 20 by transmitting non-cellular RF signals to the secondary RF transceiver 23 of the fixed cellular communication device. With the mobile wireless RF transceiver 50, a user may access the cellular network via the fixed cellular communication device 20 as opposed to transmitting voice or data directly to a cellular base station (not shown). Also, the mobile wireless RF transceiver 50 may advantageously transmit through the fixed wireless RF communication device 30 where data is relayed to the fixed cellular communication device 20. The mobile wireless RF transceiver 50 includes a received signal strength measurement capability for the purpose of measuring distance between it and the fixed wireless RF communication device 30 or the fixed cellular communication device 20.

Figure 6:
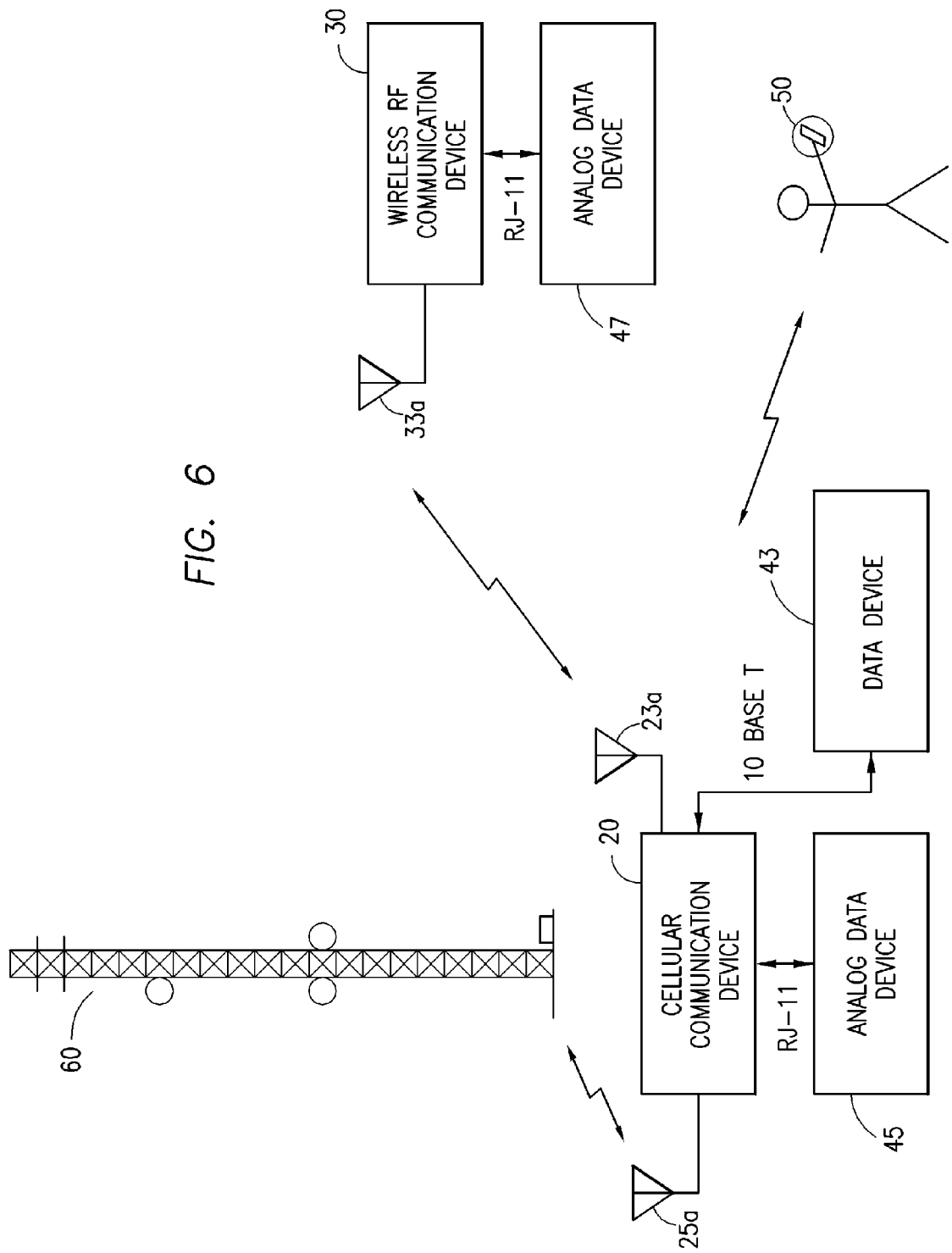
FIG. 6 is a system diagram including the fixed cellular communication device and a corresponding cell tower according to the present invention.

FIG. 6 shows a system overview according to the present invention. As shown in the system overview, the fixed cellular communication device 20 transmits signals to a cell tower 60 in order to access a cellular network. Shown and connected to the fixed cellular communication device 20 are a data device 43 and an analog data device 45 where the analog data device is connected to the phone jack 12 and the data device is connected the Ethernet jack 14. Communications between the fixed wireless RF communication device 30 and the fixed cellular communication device 20 are achieved through antenna 33a and antenna 23a. The fixed cellular communication device 20 accesses the cellular network through the cell tower 60. Signals are transmitted from the fixed cellular communication device 20 through antenna 25a to cell tower 60. Signals from the fixed wireless RF communication device 30 or the mobile wireless RF device 50 may be formatted and reformatted for subsequent transmission in the form of short data packets via the cellular network. The system enables the fixed cellular communication device 20 to translate data messages from one format to another. Furthermore, the fixed cellular communication device 20 may be polled or queried via the cellular network. The fixed cellular communication device 20 may include a link mobile identification number (MIN) and an electronic serial number (ESN) or an international mobile equipment identifier (IMEI). These identifying identifiers may be transmitted via the cellular network. Furthermore, the fixed cellular communication device 20 may be accessed and programmed via the cellular network.

The instant invention has been shown and described herein in what is considered to be the most practical and preferred embodiment. It is recognized, however that departures may be made therefrom within the scope of the invention and that obvious modifications will occur to a person skilled in the art.

What is claimed is:

1. A communication device for sending and receiving data via a cellular network, comprising:
    a cellular transceiver that transmits and receives data on a cellular network via data packets;
    a non-cellular RF transceiver for receiving signals from an external non-cellular RF device that is external to the communication device, wherein the cellular transceiver re-transmits on the cellular network data packets received by the non-cellular RF transceiver from the external non-cellular RF device; and
    a microcontroller for controlling functionality of components of the communication device and transmission of data through the communication device;
    wherein the communication device is adapted in a physical form of an AC wall adapter that includes a RJ-11 phone line jack and an Ethernet jack.

2. The communication device according to claim 1, further comprising a data device, wherein, upon initiation of communication by the data device, the communication device processes the data and forwards the data on to the cellular network, via the cellular transceiver, as a series of formatted circuit-switched or packet-switched data packets.

3. The communication device according to claim 2, further comprising a serial data port for communication with the data device.

4. The communication device according to claim 1, further comprising a GPS receiver, wherein the GPS receiver provides positional data for transmission, by the cellular transceiver, over the cellular network.

5. The communication device according to claim 1, further comprising:
    an Ethernet transceiver coupled to the Ethernet jack, wherein the Ethernet jack provides a means for connecting a data device to the communication device and wherein the Ethernet transceiver includes provisions for 10 Base T, CAT-5 bi-directional data, wherein the communication device processes data received from the data device, and wherein the cellular transceiver transmits said data as a series of formatted circuit-switched or packet-switched data packets on the cellular network; and
    subscriber line interface circuitry coupled to the RJ-11 phone line jack, wherein the RJ-11 phone line jack provides a means to connect an analog modem device to the communication device and wherein the subscriber line interface circuitry provides a dial tone and loop voltage.

6. The communication device according to claim 5, wherein the AC wall adapter includes an AC plug on a first side of the AC wall adapter and an Ethernet jack on one or more sides of the AC wall adapter other than the first side.

7. The communication device of claim 6, wherein the Ethernet jack is on a side opposite the first side.

8. The communication device of claim 6, wherein the AC plug is adapted to plug into an AC power outlet.

9. The communication device of claim 6, including a power supply for supplying DC power to components of the communication device, and wherein the Ethernet jack is coupled to the Ethernet transceiver, and the AC plug is coupled to the power supply.

10. The communication device according to claim 5, further comprising an analog modem device connected to the RJ-11 phone line jack.

11. The communication device according to claim 1, wherein the microcontroller includes memory storage means, and means to format data transmitted via the cellular network.

12. The communication device according to claim 1, wherein the non-cellular RF transceiver includes at least one of a WiFi transceiver, a Bluetooth transceiver and a ZigBee transceiver.

13. The communication device according to claim 1, wherein, prior to re-transmission by the cellular transceiver, the signals received by the non-cellular RF transceiver from the external non-cellular RF device are reformatted by the communications device into a series of circuit-switched data packets.

14. The communication device according to claim 1, wherein, prior to re-transmission by the cellular transceiver, the signals received by the non-cellular RF transceiver from the external non-cellular RF device are reformatted by the communications device into a series of packet-switched data packets.

15. The communication device according to claim 5, further comprising a serial data port for receiving the data from the data device, wherein the communication device processes data received from the data device, and wherein the cellular transceiver transmits said data as a series of formatted circuit-switched or packet-switched data packets on the cellular network.

16. A system, comprising:
    a fixed communication device, wherein the fixed communication device includes a cellular transceiver, a secondary RF transceiver, subscriber line interface circuitry including a phone line connection, an Ethernet transceiver including an Ethernet connection, a microcontroller and a power supply for supplying DC power to components of the fixed communication device, wherein the cellular transceiver transmits data on a cellular network, wherein the microcontroller controls said transmission of data, and wherein the secondary RF transceiver provides a non-cellular, bi-directional communication link with non-cellular devices; and a data device connected to the fixed communication device via the Ethernet connection, wherein the cellular transceiver transmits, via the cellular network, data received from the data device without initiating a voice call on the cellular network, and wherein, upon initiation of communication by the data device, the fixed communication device processes the data and forwards the data as a series of formatted packet-switched data packets, wherein the fixed communication device is adapted in a physical form of an AC wall adapter.

17. The system according to claim 16, further comprising:
a non-cellular RF communication device including a secondary RF transceiver, subscriber line interface circuitry, an Ethernet transceiver, a microcontroller and a power supply, wherein the non-cellular RF communication device indirectly transmits and receives data over the cellular network, wherein such data is relayed through the fixed communication device, wherein the secondary RF transceiver of the non-cellular RF communication device transmits and receives data with the secondary RF transceiver of the fixed communication device, wherein the subscriber line interface circuitry and Ethernet transceiver provide means for connection of one or more data devices to the non-cellular RF communication device, and wherein the microcontroller provides a means for controlling data transmissions between the fixed communication device and the non-cellular RF communication device; and
a second analog data device, coupled to the non-cellular RF communication device, wherein the second analog data device transmits and receives data via the non-cellular RF communication device for transmission over the cellular network by the fixed communication device.

18. The system according to claim 16, including an analog data device connected to the fixed communication device via the phone line connection, wherein the cellular transceiver transmits, via the cellular network, data received from the analog data device.

19. The system according to claim 16, wherein the secondary RF transceiver includes at least one of a 802.11a/b/g/n WiFi transceiver, a 802.15.4 ZigBee transceiver and a 802.15.1 Bluetooth transceiver.

20. The system according to claim 16, including a mobile non-cellular RF transceiver that includes a RF transceiver module for transmitting and receiving data with the secondary RF transceiver of the fixed communication device, a microcontroller and a power supply, wherein the mobile non-cellular RF transceiver transmits and receives data via the fixed communication device over the cellular network.

21. The system of claim 16, wherein the AC adapter includes an AC plug, a phone jack and an Ethernet jack, wherein the AC plug is adapted to plug into an AC power outlet.

22. The system of claim 21, wherein the AC plug is on a first side of the AC wall adapter and the phone jack and the Ethernet jack are on one or more sides of the AC wall adapter other than the first side.

23. The system of claim 22, wherein the phone jack and the Ethernet jack are on a side opposite the first side.

24. The system of claim 23, wherein the AC plug is coupled to the power supply, the phone jack is coupled to the subscriber line interface circuitry and the Ethernet jack is coupled to the Ethernet transceiver.

25. A fixed communication device, comprising:
a cellular transceiver that communicates data on a cellular network via data packets;
a secondary RF transceiver for wireless non-cellular communication of data with a non-cellular device;
an Ethernet transceiver for coupling to a data device; and
a microcontroller including a memory, wherein the microcontroller controls functionality of components of, and transmission of data through, the fixed communication device,
wherein, upon initiation of communication of data by one of the non-cellular device and the data device, the fixed communication device processes the data and forwards the data on to the cellular network, via the cellular transceiver, as a series of formatted data packets, and
wherein the fixed communication device is adapted in a physical form of an AC wall adapter that includes a phone jack and an Ethernet jack.

26. The fixed communication device of claim 25, including:
a modem; and
subscriber line interface circuitry, coupled to the modem, the subscriber line interface circuitry for coupling to an analog data device.

27. The fixed communication device of claim 26, wherein the phone jack is coupled to the subscriber line interface circuitry and the Ethernet jack is coupled to the Ethernet transceiver.

28. The fixed communication device of claim 25, wherein the AC wall adapter includes an AC plug on a first side, and includes, on one or more sides other than the first side, the phone jack and the Ethernet jack.

29. The fixed communication device of claim 28, wherein the phone jack and the Ethernet jack are on a side opposite the first side.

30. The fixed communication device of claim 29, wherein the, wherein the AC plug is adapted to plug into an AC power outlet.

31. The fixed communication device of claim 30, including a power supply for supplying DC power to components of the fixed communication device, and wherein the AC plug is coupled to the power supply.

32. The fixed communication device of claim 25, wherein transmission of the data packets takes place without voice call origination on the cellular network.

* * * * *